Dec. 5, 1967   J. W. WATERS ET AL   3,356,823
ARC WELDING ELECTRODE HOLDER
Filed July 10, 1964
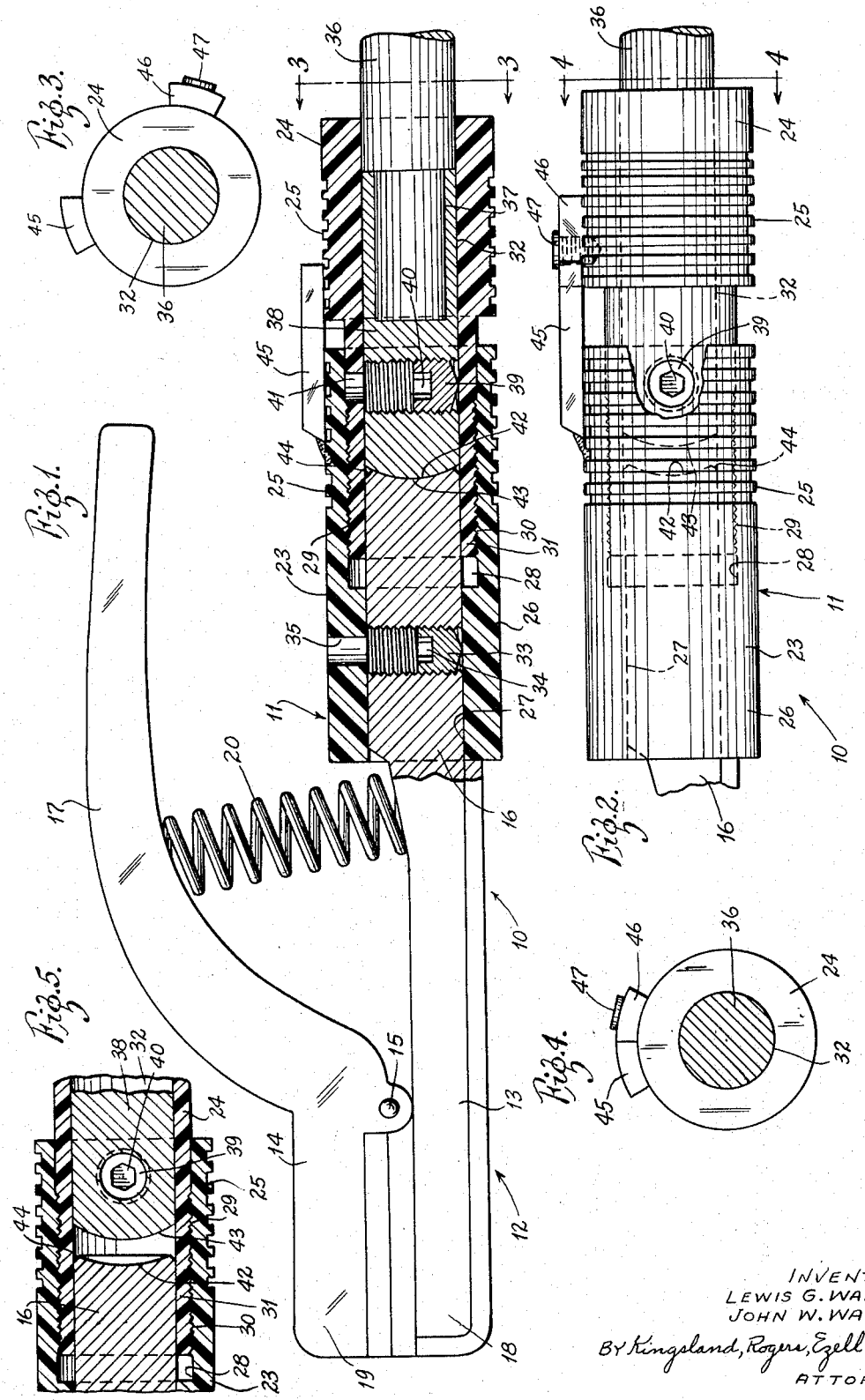
INVENTORS:
LEWIS G. WALLACE,
JOHN W. WATERS,
BY Kingsland, Rogers, Ezell & Robbins
ATTORNEYS

United States Patent Office 3,356,823
Patented Dec. 5, 1967

3,356,823
ARC WELDING ELECTRODE HOLDER
John W. Waters, 155 W. Henfer, and Lewis G. Wallace,
10416 Ware St., both of New Orleans, La. 70123
Filed July 10, 1964, Ser. No. 381,794
3 Claims. (Cl. 219—138)

ABSTRACT OF THE DISCLOSURE

A holder for an arc welding electrode comprising a pair of jaws for clamping the electrode, one of the jaws being of electrically conductive material and having an extension, an electrically insulating sleeve surrounding the extension, an electric cable, a second electrically insulating sleeve surrounding the cable, the two sleeves having complementary threads enabling them to be relatively rotated to adjust their relative positions in an axial direction, the respective ends of said conductive jaw extension and electric cable having complementary convex and concave surfaces adapted to be brought in contact upon relative rotation of the sleeves, said sleeves having a lug attached to each whereby a stop means is provided upon rotation of the sleeves less than 360° relative to one another to positions at which contact is broken between the said convex and concave ends.

---

This invention relates to a holder for a device to which electrical current is to be supplied, such as a holder for an arc welding electrode. The invention is particularly directed to a circuit breaker built into the electrode holder. Features of this electrode holder are safety, economy and simplicity.

In general, the holder comprises a handle that supports an electrically conductive jaw. A second jaw has a pivotal connection to the first jaw and has an operating lever extending past the handle in spaced relation thereto. A spring biases the jaws into contact with one another or with the sides of an arc welding electrode clamped between the jaws. The construction of the jaws is conventional.

The invention is in the design of the handle. It includes two parts of electrically insulated material. The two insulating parts are threaded together to provide an outer sleeve which is held by the user during a welding operation. The handle parts are hollow. An extension of one of the jaws extends into one of the handle parts. A conductive member to which an electric cable is connected extends into the other handle part. Set screws fasten the jaw extension and the conductive member tightly in place. Thus, when the outer sleeves are threaded together or apart, the jaw extension and the conductive member are threaded or moved together or apart. This makes or breaks the electrical contact between the conductor cable and the electrode holding jaw.

Another feature of this device is that the jaw end can be readily disconnected from the cable end without the use of any tool or tools for ready exchange and replacement, and that the cable end is electrically insulated so that danger of accidental grounding, shocking and damage to electrical current carrying parts is eliminated.

The general object of this invention is to provide a holder for an electric current carrying device, wherein the holder has a handle with relatively movable parts for making and/or breaking electrical contact to the electrically conductive device.

A particular object of the invention is to provide such a holder wherein the handle includes separate parts threaded together and made of conductive material, with conductive parts fitted within the handle parts for being brought together and separated when the handle parts are threaded relative to one another. Another object of the invention is to provide complementary curved surfaces at the contact area between the electrically conductive parts thereby creating a large contact area for positive electrical contact and cool operation.

Another object of the invention is to provide a holder for an electrically conductive device, such as a welding electrode, which has a built-in circuit breaker easily operable upon rotation of parts of the handle of the holder.

Still another object of the invention is to provide an electrode holder having relatively rotatable handle parts with contact elements within them which are alternately made and broken when the handle parts are rotated, and wherein the contact surfaces are of complementary curvature and are automatically wiped free of grit and corrosive matter when twisted together. An advantage of the rotational action for making contact is the automatic compensation for wear of the contact areas achieved by slight further rotation of the handle parts.

Another object is to provide a durable, uncomplicated inexpensive electrode holder having an easily operable contact opening feature.

Other objects and advantages will be apparent to those skilled in the art.

In the drawings.

FIGURE 1 is a side elevation view of the holder with the handle being shown in longitudinal section and in the closed circuit condition;

FIGURE 2 is a fragmentary side elevation view of the handle of the electrode holder with the circuit in open condition;

FIGURE 3 is a view in section taken along the line 3—3 of FIGURE 1;

FIGURE 4 is a view in section taken along the line 4—4 of FIGURE 2; and

FIGURE 5 is a fragmentary view in longitudinal section through the contact position of the handle with the contacts in the open position.

Referring now to the drawing, the electrode holder 10 has a handle assembly 11 and a jaw assembly 12. The jaw assembly 12 comprises a pair of jaw members 13 and 14 hinged together about a pin 15 as is conventional. One of the jaw members 13 has an extension 16 that is connected into the handle assembly 11 as will be described. The other jaw member 14 has a lever extension 17 that extends generally opposite the handle assembly 11. Opposite the extension 16 and the lever 17, the jaw members 13 and 14 have gripping ends 18 and 19 that are movable toward and away from one another to grip and release an electrode as is conventional. A compression spring 20 biases the gripping ends 18 and 19 into contact with one another.

The handle assembly 11 includes two sleeves 23 and 24 which are made of stiff insulating material. Both the sleeve members 23 and 24 have ribbed outer surfaces 25 to provide a better gripping surface.

The forward end 26 of the sleeve member 23 has an inner surface 27 of an appropriate diameter to accommodate the jaw extension 16. The sleeve member 23 has an enlarged diameter inner surface 28 having internal threads 29. The other sleeve member 24 has external threads 30 on its forward end 31 complementary to the internal threads 29. Thus, the sleeve members 23 and 24 can be connected together by the engagement between the internal threads 29 and the external threads 30, and their relative axial positions can be adjusted by relative rotation. The sleeve member 24 has a hollow internal surface 32 of a diameter substantially equal to the diameter of the inner surface 27 on the forward sleeve member 23. When the sleeve members 23 and 24 are threaded together, the forward end 31 of the sleeve member 24 also surrounds the jaw extension 16, thereby giving stability to the assembly.

The jaw extension 16 is fastened to the sleeve member 23 by a stud 33 having an Allen wrench socket 34 in its upper end. The socket 34 is accessible through a hole in the side of the sleeve member 23.

A conductor 36 is tightly fitted within the recessed end 37 of an electrically conductive lug 38 positioned within the rearward sleeve member 24. The lug 38 is fastened in place by a stud 39 having an Allen wrench socket 40 in its upper end. The socket 40 is accessible through a hole 41 in a side of the sleeve member 24. The conductor 36 can be connected to a source of electrical current (not shown) providing the hot lead to an electrode held by the electrode holder 10.

The jaw extension 16 has a concave rearward surface 42 and the forward end of the lug 38 has a convex surface 43 complementary to the concave surface 42. The outer periphery 44 of the forward end of the lug 38 is beveled.

When the sleeve members 23 and 24 are threaded together, the surfaces 42 and 43 are brought into contact and can be tightened by threading the sleeve members 23 and 24 tightly together. These curved surfaces 42 and 43 provide a broad contact area for good electric contact between the conductor 36 and the jaw extension 16.

There is a stop 45 permanently fastened to the forward sleeve member 23. Another stop 46 is removably fastened to the rearward sleeve member 24 by a set screw 47. The stops 45 and 46 are positioned so that when the sleeve member 24 is rotated in a counterclockwise direction relative to the sleeve member 23, as viewed in FIGURE 3, the stop members 45 and 46 will come into contact at which time the surfaces 42 and 43 are moved out of contact with one another, as illustrated in FIGURE 2. The surfaces 42 and 43 are brought back into contact by rotation of the rearward sleeve member 24 in a clockwise direction relative to the sleeve member 23, as viewed in FIGURE 3. The sleeve member 24 can be thus rotated until the surfaces 42 and 43 are in firm contact.

This electrode holder is very easy to use. The electrode (not shown) is easily clamped between the jaws 13 and 14 upon squeezing the lever extension 17 toward the handle 11 to spread the jaw extensions 18 and 19. When the jaw extensions 18 and 19 are released, the spring 20 presses these extensions against the sides of the electrode.

The electric conductor 36 supplies current to the electrode when the contact areas 42 and 43 are in contact with one another, as illustrated in FIGURE 1. When the contact surfaces 42 and 43 are spread, as shown in FIGURES 2 and 5, the circuit is open.

The contact surfaces 42 and 43 are moved into and out of contact by relative rotation of the sleeve members 23 and 24, and this rotation is most readily accomplished by alternately swinging the lug 46 in a counterclockwise direction toward the lug 45, as viewed in FIGURE 3 to break contact, and from that position in a clockwise direction from the lug 45 as viewed in FIGURE 4 to make contact.

The lugs 45 and 46, beside providing convenient levers for rotation of the sleeve members 23 and 24, afford a positive stop when in contact as shown in FIGURE 4 by which the user assuredly knows the contact surfaces 42 and 43 are out of contact. Thus an easily operable means are provided to assure safety of the electrode holder permitting supply of current to the electrode to be broken and thus eliminating wasted electrical energy and the possibility of injury.

Since there is no positive stop against rotation of the lug 46 in a clockwise direction away from the lug 45, as shown in FIGURE 3, the lug 46 can be rotated until the surfaces 42 and 43 are brought into tight contact. This is true regardless of the wear on the surfaces 42 and 43; the assembly is thus automatically compensating for wear on the surfaces 42 and 43.

The beveled outer edge 44 surrounding the contact surface 42 lets normal wear on the surface 42 occur without the creation of interference at the outer edge 44.

The jaw 13 and the conductor 36 can be removed without completely separating the sleeve members 23 and 24. This removal of the jaw 13 and the conductor 36 is accomplished by loosening the studs 33 and 39 and sliding the jaw and conductor 36 (together with the lug 38) out of the sleeve members 23 and 24. If it is desired to completely separate the sleeve members 23 and 24, the lug 46 can be removed by releasing the set screw 47, and then the sleeve member 24 can be completely rotated to unthread it from the sleeve member 23.

Various changes and modifications may be made within the purview of this invention as will be readily apparent to those skilled in the art. Such changes and modifications are within the scope and teaching of this invention as defined by the claims appended thereto.

What is claimed is:

1. A holder for an arc welding electrode (or the like) comprising a pair of jaws for clamping the electrode, one of the jaws being of electrically conductive material and having an extension, an electrically insulating sleeve surrounding the extension, an electric cable, a second electrically insulating sleeve surrounding the electric cable, the two sleeves having complementary threads enabling them to be relatively rotated to adjust their relative positions in an axial direction, the conductive jaw extension having an end facing the electrical cable, and the electrical cable having an end facing the conductive jaw extension, the two said ends having complementary convex and concave surfaces adapted to be brought in contact upon relative rotation of the sleeves bringing them into closer axial proximity with one another, a lug attached to the outer surface of each sleeve, the lugs being of sufficient lengths as measured parallel to the axes of the sleeves to have portions in the same radial plane, the lugs being attached to the sleeves at positions which are circumferentially spaced from one another when the sleeves are relatively rotated to the positions which establish contact between the complementary end surfaces of the electrical cable and the jaw extension, the positions of attachment of the lugs causing them to contact one another upon rotation of the sleeves less than 360° relative to one another to positions at which the said contact is broken, whereby the lugs provide a positive stop for the sleeves when the said contact is broken and provide levers facilitating rotation of the sleeves, one of the lugs being removable to permit complete separation of the sleeves.

2. The holder of claim 1 wherein the concave surface has a beveled outer edge.

3. The holder of claim 1 including a set screw for releasably fastening the conductive jaw extension and the electrical conductor to their respective insulating sleeves.

References Cited

UNITED STATES PATENTS

| | | | |
|---|---|---|---|
| 1,865,003 | 6/1932 | Hall | 219—138 |
| 2,415,778 | 2/1947 | Welch | 219—142 |
| 2,481,952 | 9/1949 | Schwartz et al. | 219—138 |
| 2,773,966 | 12/1956 | Mastropole | 338—149 |
| 2,894,086 | 7/1959 | Rizer | 219—138 |
| 2,976,396 | 3/1961 | Booher | 219—138 |
| 2,993,972 | 7/1961 | Stewart | 219—138 |
| 3,108,244 | 10/1963 | Nirenberg et al. | 338—144 |

RICHARD M. WOOD, *Primary Examiner.*

W. BROOKS, *Assistant Examiner.*